Figure 1:
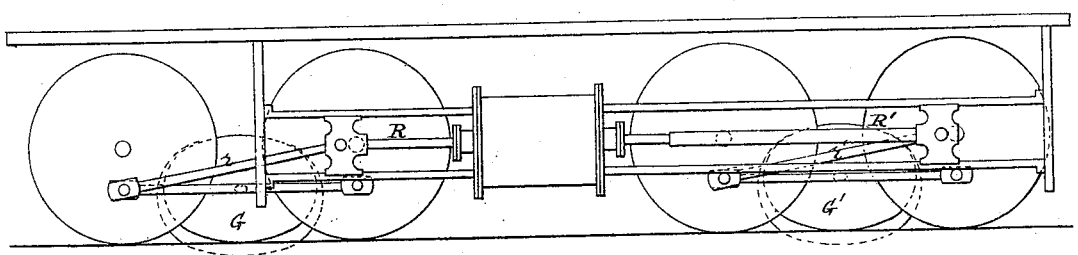

W. N. HUTCHINSON.
Locomotive Steam-Engines.

No. 150,242. Patented April 28, 1874.

Witnesses. Inventor.

UNITED STATES PATENT OFFICE.

WILLIAM N. HUTCHINSON, OF WELLESBOURNE, BIDEFORD, ENGLAND.

IMPROVEMENT IN LOCOMOTIVE STEAM-ENGINES.

Specification forming part of Letters Patent No. 150,242, dated April 28, 1874; application filed March 16, 1874.

*To all whom it may concern:*

Be it known that I, WILLIAM NELSON HUTCHINSON, of Wellesbourne, in the county of Devon, England, have invented or discovered certain Improvements in Locomotive Steam-Engines; and I do hereby declare that the following is a full, clear, and exact description thereof, reference being had to the drawings hereunto annexed—that is to say:

The object of my invention is to produce a harmonious action or movement of the connecting-rods and driving-wheels in those engines in which the piston-rod is connected from each end of the cylinder; and it consists in prolonging the piston-rod to a length equal to the distance separating the crank-pins of three contiguous wheels, and so arranging the connecting-rods therewith that they both point in the same direction, and move in parallel planes.

Many attempts have been made to drive wheels from both ends of a steam-cylinder, but they failed because a correct length was not given to the piston-rod, and from one of its ends not being produced to such an extent that the connecting-rods would always travel in parallel planes. By having made the method of driving the wheels at one end of the cylinder an exact counterpart of the method employed at the other end, a slip of the wheel was produced, which quite vitiated the anticipated advantages from the double action. At the extreme of the piston's travel the longitudinal centers of the piston-rod and the connecting-rods, with their crank-pins, were (as is usual) in one line. To secure harmony in the rotation of the wheels, it is obvious that the crank-pins ought ever to remain at the same distance apart; but the moment the connecting-rods diverge from the line just described, a drag, and consequently a displacement of the pins, commenced. The divergence of the connecting-rods from their alignment with the piston-rod formed the three rods into a kind of curve, of which an imaginary line connecting the crank-pins became the chord. The greater the divergence of the connecting-rods, the shorter became the chord—consequently the less the distance between the crank-pins. This drag on the pins created such a slip of the wheels on the rail as to render quite abortive all the efforts made to combine saving in steam-power with compactness in construction, and diminishing the number of parts. It is calculated that with wheels in diameter four feet six inches, length of connecting-rods six feet, stroke two feet, the slip of the head of the wheels must be 4.45 inches.

Figure 1 shows a locomotive in which the piston-rod R R' is so much produced at the end R' that, measuring from pin to pin at its extremities, it is exactly the length which separates the centers of three contiguous wheels, being the same distance which separates the crank-pins. Whatever may be the number of wheels employed, this rule holds, that the length of the piston-rod shall always equal the distance which separates the crank-pins. The lengthened end of the piston-rod is produced with a crank, $c$, close to the cylinder, in order to give space for the connecting-rod $r$ to travel in the same vertical plane as the other connecting-rod, $r'$. It is manifest that, by this means, the detrimental slip before described is wholly overcome, for the two connecting-rods ever travel in parallel planes, with their crank-pins at an unvarying distance one from the other, and that unusual harmony and endurance is given by the work performed at one side of the piston being exactly balanced by the work done on the other side. The transverse interval between the two cylinders need not be greater than is usual.

If, under ordinary circumstances, greater steam-power be required to drive the wheels which be farthest from the cylinder than those which are next to it, it follows that when driving only two wheels there would be a gain by placing the cylinder between the two.

Having thus described the nature of the invention, and the manner in which I think the same may best be carried out, I wish it to be understood that I do not confine myself to the precise details, arrangements, and proportions I have described and drawn, as these may be varied without departing from the principle of the invention; but

What I consider to be novel and original, and therefore claim, is—

The piston-rod passing through both ends of the cylinder, and elongated at R', in combination with connecting-rods $r\ r'$, arranged to work parallel with each other, substantially as and for the purpose described.

In witness whereof I, the said WILLIAM NELSON HUTCHINSON, have hereunto set my hand and seal this sixteenth day of December, one thousand eight hundred and seventy-three.

W. N. HUTCHINSON. [L. S.]

Signed in the presence of—
 J. G. GUNN, *Accountant, Bideford.*
 THOS. ANDREW, *of Bideford,*
      *Attorney's Clerk.*